United States Patent
Appel et al.

(10) Patent No.: US 8,212,434 B2
(45) Date of Patent: Jul. 3, 2012

(54) METHOD FOR OPERATING SWITCHED-MODE POWER SUPPLY UNITS

(75) Inventors: Wilhelm Appel, Laa a.d. Thaya (AT); Wolfgang Peprny, Vienna (AT); Arnold Schönleitner, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 763 days.

(21) Appl. No.: 11/991,186

(22) PCT Filed: Jul. 14, 2006

(86) PCT No.: PCT/EP2006/064249
§ 371 (c)(1),
(2), (4) Date: Apr. 1, 2009

(87) PCT Pub. No.: WO2007/031354
PCT Pub. Date: Mar. 22, 2007

(65) Prior Publication Data
US 2009/0207566 A1   Aug. 20, 2009

(30) Foreign Application Priority Data
Sep. 14, 2005  (DE) .......................... 10 2005 043 882

(51) Int. Cl.
*G01K 7/04* (2006.01)
*H05K 7/14* (2006.01)

(52) U.S. Cl. ......................................... 307/651; 307/149
(58) Field of Classification Search .................. 307/149, 307/651
See application file for complete search history.

(56) References Cited

U.S. PATENT DOCUMENTS

| 5,260,548 A * | 11/1993 | Todd et al. ............... 219/483 |
| 6,344,747 B1 * | 2/2002 | Lunghofer et al. ........ 324/537 |
| 7,742,305 B2 * | 6/2010 | Schweigert et al. ...... 361/704 |

FOREIGN PATENT DOCUMENTS

| DE | 19917341 C1 | 5/2000 |
| EP | 1739833 A2 | 1/2007 |
| JP | 07015953 A | 1/1995 |
| JP | 2004297886 A | 10/2004 |
| WO | WO 2004/027963 A1 | 4/2004 |

* cited by examiner

*Primary Examiner* — Hal Kaplan

(57) ABSTRACT

In a process for operating an air-cooled mains supply unit for industrial application, temperatures influenced by outer heat sources and by heat sources arranged in the mains supply unit are measured by thermo-elements and reported to a control system. Temperatures measured by at least two thermo-elements arranged at different measurement points are reported to the control system, and the measured temperatures are compared with temperature patterns. The comparison with known temperature patterns makes it possible to sense the totality of the thermal conditions continuously and to derive therefrom ratings for the control system.

11 Claims, 1 Drawing Sheet

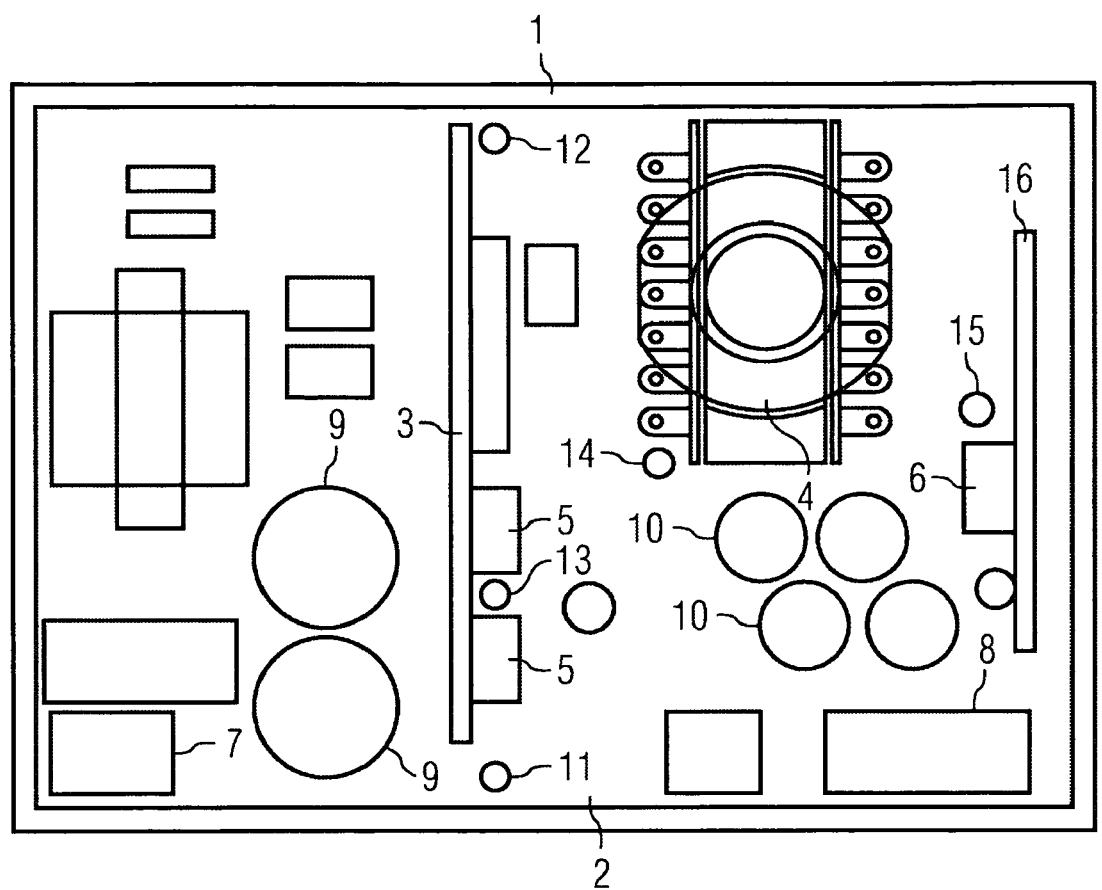

ific temperature range. The manufacturers of switched-mode power supply units therefore specify a maximum ambient temperature in data sheets for the transferable nominal power. What is known as derating is generally provided for higher ambient temperatures. The manufacturers hereby specify in data sheets by how much it is necessary to reduce the maximum transferable power to prevent component damage at higher ambient temperatures.

METHOD FOR OPERATING SWITCHED-MODE POWER SUPPLY UNITS

CROSS REFERENCE TO RELATED APPLICATIONS

This application is the U.S. National Stage of International Application No. PCT/EP2006/064249 filed Jul. 14, 2006 and claims the benefit thereof. The International Application claims the benefits of German application No. 10 2005 043 882.2 DE filed Sep. 14, 2005, both of the applications are incorporated by reference herein in their entirety.

FIELD OF INVENTION

The invention relates to a method for operating an air-cooled switched-mode power supply unit for industrial use, wherein temperatures influenced by heat sources disposed in the switched-mode power supply unit are measured using thermocouples and reported to a control facility. The invention further relates to a switched-mode power supply unit for implementing the method.

BACKGROUND OF INVENTION

Switched-mode power supply units are generally known. They are clocked transformers for connecting loads to a power network. The clock frequency here is a long way above the frequency of the network, resulting in a much smaller design compared with power network transformers with rectifiers. On the output side switched-mode power supply units supply direct voltages for a wide range of devices.

Switched-mode power supply units generally operate with pulse width modulation (PWM) and regulated constant output voltage. The transferable power here is a function of the design of the switched-mode power supply unit and the deployment conditions. Thermal conditions in particular have to be taken into account here, as the components disposed in a switched-mode power supply unit can only operate within a specific temperature range. The manufacturers of switched-mode power supply units therefore specify a maximum ambient temperature in data sheets for the transferable nominal power. What is known as derating is generally provided for higher ambient temperatures. The manufacturers hereby specify in data sheets by how much it is necessary to reduce the maximum transferable power to prevent component damage at higher ambient temperatures.

Other factors, apart from high ambient temperatures, can also lead to the overheating of switched-mode power supply units. Examples include inadequate heat dissipation or overloading due to short circuits.

Arrangements and methods, with which thermal conditions are monitored and the switched-mode power supply unit is temporarily or totally disconnected, if a limit value is exceeded, are therefore known from the prior art, to protect components from damage in the event of overheating.

JP 7015953-A1 for example describes a switched-mode power supply unit, having a temperature-controlled protective circuit for disconnection in the event of an output-side short circuit. The temperature is measured in proximity to the switching element using a temperature sensor and converted to a digital signal in an analog/digital converter. A timer, to which the digital temperature signal is supplied, is then used to determine the time for disconnection of the switching element as a function of the measured temperature when a short circuit occurs.

JP 2004297886-A1 describes a central arrangement of a temperature sensor in a switched-mode power supply unit, in order to be able to measure the temperature of a plurality of components, such as the switching element, transformer and rectifier, using this one sensor.

The TOPSwitch product family made by the manufacturer Power Integration Inc. has a PWM controller with temperature monitor. Here an analog switching circuit causes the switching element of the PWM controller to trip, as soon as the barrier junction temperature exceeds a predetermined value. Once the temperature drops below a lower threshold value, the switching element starts to switch again and the switched-mode power supply unit operates in normal mode.

Transistors provided for deployment in switched-mode power supply units and having an integrated thermal sensor are also known. With these a thermal sensor chip is disposed in the transistor and connected to its gate and source terminal. In the event of thermal overloading, the thermal sensor chip short circuits the gate and source terminal. A resistor connected in series to the gate terminal causes the trigger voltage to drop below the threshold value and the load switching circuit is disconnected.

The instances of temperature monitoring for switched-mode power supply units known from the prior art therefore relate to protection of the components of the switched-mode power supply units themselves. These are essentially the PWM controller and the switching elements. Thermal overloading then always causes the switched-mode power supply unit to disconnect and no longer to switch, until new operational readiness is recognized when the temperature drops or operators switch the switched-mode power supply unit back on again.

SUMMARY OF INVENTION

An object of the invention is to provide an improved method and an improved switched-mode power supply unit.

According to the invention this is achieved with a method of the type mentioned in the introduction, wherein temperatures measured by at least two thermocouples disposed at different measuring points are reported to the control facility and wherein the measured temperatures are compared with temperature patterns.

To implement the method at least two thermocouples disposed at different measuring points and a control facility are provided in a switched-mode power supply unit, with the control facility having means for comparing the measured temperatures with temperature patterns.

This enables more than just a temperature check for a component or for a group of components. The comparison with known temperature patterns makes it possible to capture the overall thermal situation on an ongoing basis and to derive defaults for the control facility therefrom. In this process the thermocouples supply measured values, which are assigned to corresponding points in the temperature patterns.

This means that both the production of heat by the components of the switched-mode power supply unit itself and also the production of heat by external sources are captured. It is also possible to respond correspondingly to changes in the thermal situation further to a temperature change in the ambient air or due to changed emission conditions of adjacent machines or devices.

In one simple instance of the invention at least two temperature patterns are predetermined and when the measured temperatures approximate to one of the temperature patterns, a change in the state of the switched-mode power supply unit is triggered. It is thus possible to indicate critical operating states to operators or to predetermine changed regulation values with little outlay.

It is hereby advantageous if the level of transferable power is established as a function of temperature patterns and if, when the measured temperatures approximate to one of the temperature patterns, the value established for this temperature pattern is predetermined for the transferable power. The transferable power is thus adjusted on an ongoing basis to current overall thermal conditions and is not just a function of the thermal state of individual components. This leads to an improvement in efficiency and fault tolerance.

It is also advantageous if specific temperature distributions produced by air cooling are assigned as temperature patterns to possible installation positions for the switched-mode power supply unit and if the installation position of the switched-mode power supply unit is established by comparing the measured temperatures with these temperature patterns. An unfavorable installation position can then be indicated to operators or the maximum transferable power can be adjusted to resulting air flow conditions.

The temperatures measured by the thermocouples are favorably stored as temperature curves. In the event of damage or during inspection or maintenance work it is then possible to evaluate the thermal situation over a past period. This allows conclusions to be drawn relating to the selection of replacement devices or the change in operating conditions.

One advantageous refinement of a switched-mode power supply unit for implementing the method comprises means for predetermining at least two temperature patterns and for capturing an approximation of the measured temperatures to one of the temperature patterns and for changing the state of the switched-mode power supply unit. Such means make it possible to adjust the operating state of the switching means to thermal conditions as a function of the predetermined temperature pattern or to indicate thermal limit values to operators by changing a display state.

It is advantageous if means are also provided for predetermining the transferable power. If it is identified from a comparison of the measured temperatures with the corresponding points in the temperature pattern that there is an approximation to a temperature pattern, a maximum transferable power assigned to the temperature pattern is predetermined. The switched-mode power supply unit can then be operated over a wide temperature range with the maximum possible power that is still thermally tolerable for the components. This optimizes utilization compared with conventional switched-mode power supply units, which disconnect from a permanently predetermined load.

For the position determination mentioned as an advantageous instance of the invention at least two thermocouples have to be disposed in such a manner that a change in the position of the switched-mode power supply unit brings about a change in the measured temperatures. This utilizes the effect brought about by air cooling that the air flowing in through ventilation slots in the housing on the lower side is cooler than the air escaping at the top, thereby allowing simple position determination.

BRIEF DESCRIPTION OF THE DRAWING

The invention is described in an exemplary manner below with reference to the accompanying FIGURE, in which:

FIG. 1 shows a schematic diagram of the structure of a switched-mode power supply unit.

DETAILED DESCRIPTION OF INVENTION

FIG. 1 shows a switched-mode power supply unit from the top out. The housing 1 is shown here without its front cover, to show the components without obstruction. The arrangement of the individual components and the installation position of the switched-mode power supply unit shown correspond to the prior art. Other arrangements or installation positions are also possible however.

The input terminals 7 are shown bottom left on a printed circuit board 2. They connect the switched-mode power supply unit to a mains voltage. Next to them are the input capacitors 9, which are generally configured as electrolytic capacitors.

A primary cooling body 3 is disposed perpendicular to the printed circuit board 2 and has two switching elements 5 attached to it. To its right, in the upper region of the housing 1, is a transformer 4. The output capacitors 10, configured as electrolytic capacitors, are disposed below this.

A secondary diode 6—similarly provided with a cooling body 16—is shown on the right-hand edge of the housing 1, said secondary diode 6 forming the rectifier circuit of the secondary element together with the output capacitors 10.

The output terminals 8, to which a load can be connected, are disposed bottom right. The housing 1 generally has ventilation slots on its lower side and upper side, so that cooling air at ambient temperature enters the interior of the housing from below, is heated there by the heat-emitting components and then escapes in an upward direction at a higher temperature.

According to the invention at least two of the five thermocouples 11 to 15 shown are disposed in the switched-mode power supply unit. The choice of measuring points is hereby a function of the switched-mode power supply unit requirements.

To capture the general cooling behavior, the two thermocouples 11 and 12 are advantageously on the upper and lower edge of the housing 1. The lower thermocouple 11 hereby measures the temperature of the ambient air flowing in from below and the upper thermocouple 12 measures the temperature of the heated outlet air. During the development of a switched-mode power supply unit at least two temperature patterns are determined by experiment. A temperature pattern is a group of temperatures, which result at the same time at the individual measuring points in a specific operating state.

An optimal temperature pattern results for example with a recommended installation position and maximum permissible ambient temperature for the full power transfer. A second temperature pattern results with a changed installation position or at too high an ambient temperature. A plurality of temperature patterns is also favorably determined, resulting with different installation positions and different operating conditions.

The temperature of the switching elements 5, which are generally configured as field effect transistors (FETs), is advantageously measured using a thermocouple 13 arranged in direct proximity. It is also advantageous to dispose one thermocouple 14 adjacent to the transformer 4 and one thermocouple 15 adjacent to the secondary diode 6, to measure the temperatures of both these components.

In the exemplary embodiment shown five thermocouples 11 to 15 are therefore provided, from which individual groups of five temperatures result as temperature patterns.

The temperature patterns determined by experiment are available to the control facility of the switched-mode power supply unit for comparison with the temperatures measured during operation. A storage element and a microcontroller or a digital signal processor are suitable means for this purpose.

When comparing the measured temperatures with the temperature patterns, the temperature which best corresponds to the measured temperatures is determined. This is done for example in such a manner that the individual differences between the measured temperature of a measuring point and the corresponding temperatures of the individual temperature patterns are first determined for every measuring point. The sum of the differences then represents a minimum for the group of differences of a specific temperature pattern. If increased monitoring of one or more measuring points is required for a switched-mode power supply unit due to critical deployment conditions or due to particularly temperature-sensitive components, it is favorable to weight the differences assigned to these measuring points more.

For operation of the switched-mode power supply unit a specific setpoint state is assigned to each temperature pattern. It is expedient here to predetermine specific maximum transferable powers. The control facility of the switched-mode power supply unit therefore controls the switching elements as a function of the temperature pattern with the best correspondence at the time. This allows a switched-mode power supply unit to be operated permanently even at thermal overload, in that a smaller transferable power is predetermined at higher temperatures. A critical temperature pattern is hereby favorably defined, at which the switched-mode power supply unit disconnects totally. This may be necessary for example in the event of an output-side short circuit, in which the measured temperatures approximate to the critical temperature pattern. The advantage compared with the prior art is therefore an automatic derating in unfavorable thermal conditions. It is also possible to predetermine a higher transferable power in particularly good cooling conditions (e.g. at low ambient temperatures).

To bring about a faster adjustment of the switched-mode power supply unit to changing conditions, besides the temperature pattern that corresponds best to the temperatures measured at the time, the temperature pattern that is a development of the temperature curves of the individual measuring points is also decisive. It is hereby checked on an ongoing basis whether the temperatures tend toward a higher or lower level temperature pattern. It is thus possible to reduce power for example even before a critical temperature pattern is reached, with the result that it may be possible to avoid total disconnection of the switched-mode power supply unit.

As well as predetermining a maximum transferable power, it is also expedient to indicate to operators by means of suitable optical or acoustic signals that a critical thermal state is or has been reached. It can thus be indicated to operators for example that the switching element has been installed in an unfavorable position or that the outlet air slots of the housing 1 are covered. In the case of an incorrectly installed switched-mode power supply unit the measured temperature values of the two thermocouples 11 and 12 located on the edge are transposed. In other words the thermocouple 12, which should actually measure the warmer outlet air on the upper side, measures the temperature of the cool ambient air flowing in and the other thermocouple 11 measures the warm outlet air. The thermal situation therefore best corresponds to the temperature pattern determined in an experiment with an incorrectly installed switched-mode power supply unit. A corresponding reporting signal is assigned to this temperature pattern, with the result that the approximation of the measured signals to this temperature pattern triggers a signal. The installation position is significant based on the arrangement of the individual components. Thus for example the output capacitors 10 should be in the cooler region below the transformer 4.

For a differentiated evaluation of the thermal conditions it is favorable to divide the available measuring points into a number of groups, with specific temperature patterns being assigned to each group. To assess the general cooling behavior and to determine installation position for example, a number of temperature patterns are determined in experiments for the thermocouples 11 and 12 located on the edge and, to monitor the components, temperature patterns are also determined for the thermocouples 13 to 15 located in the interior. Operation of the switched-mode power supply unit then depends on thermal conditions in the individual groups of measuring points.

Switched-mode power supply units are frequently operated at the non-constant temperature of the ambient air. It is advantageous here if storage means are provided, which store the pattern of measured temperatures for subsequent evaluations. If the switched-mode power supply unit fails to supply the required power for example, service engineers can ascertain by evaluating the temperature curve measured using the thermocouple 11 disposed on the lower edge whether this is due to the too high temperature of the cooling air flowing in. The cooling air can then be cooled by corresponding measures, such as additional switching cabinet ventilation for example.

The invention claimed is:

1. A method for operating an air-cooled switched-mode power supply unit for industrial use, comprising:
   providing a switched-mode power supply unit comprising heat-emitting switching elements;
   providing at least two thermocouples disposed in the switched-mode power supply unit at different measuring points to measure temperatures;
   measuring temperatures, by the at least two thermocouples, influenced by the heat-emitting switching elements;
   transmitting measured temperature data from the at least two thermocouples to a control unit;
   comparing the measured temperature data with temperature patterns stored in the control unit, and
   controlling, by the control unit, the switched-mode power supply unit as a function of a selected temperature pattern, wherein the selected temperature pattern corresponds to the measured temperature data, and wherein the power supply unit adjusts transferred powers to a power network according to the selected temperature pattern.

2. The method as claimed in claim 1, wherein at least two temperature patterns are stored in the control unit.

3. The method as claimed in claim 2, wherein the temperatures measured by the thermocouples are stored as temperature curves.

4. The method as claimed in claim 1, wherein a level of transferable power is established as a function of the temperature patterns, and wherein, when the measured temperatures approximate to one of the temperature patterns, a value established for this temperature pattern is predetermined for the transferable power.

5. The method as claimed in claim 1, wherein specific temperature distributions produced by air cooling are assigned as temperature patterns to possible installation positions for the switched-mode power supply unit, and wherein the installation position of the switched-mode power supply unit is established by comparing the measured temperatures with these temperature patterns.

6. The method as claimed in claim 1, wherein the temperatures measured by the thermocouples are stored as temperature curves.

7. A switched-mode power supply unit, comprising:
   at least two thermocouples located at different measuring points in the switched-mode power supply unit, a control unit for comparing measured temperature data with temperature patterns which are stored in the control unit,
a housing,
an input terminal,
a printed circuit board,
input capacitors,
a cooling body,
switching elements attached to the cooling body,
output capacitors,
an output terminal,
ventilation slots on a lower side of the housing, and
ventilation slots on an upper side of the housing,
wherein cooling air at ambient temperature
   enters an interior of the housing via the ventilation slots on the lower side of the housing,
   is heated inside the housing, and
   exits in an upward direction at a higher temperature via the ventilation slots on the upper side of the housing,
wherein the thermocouples are located on an upper and lower edge of the housing.

8. The switched-mode power supply unit as claimed in claim 7, wherein the control unit predetermines a transferable power.

9. The switched-mode power supply unit as claimed in claim 7, wherein a temperature of switching elements is measured based upon a thermocouple arranged in direct proximity to the switching elements.

10. The switched-mode power supply unit as claimed in claim 9, wherein a thermocouple is adjacent to a transformer of the switched-mode power supply.

11. The switched-mode power supply unit as claimed in claim 10, wherein a thermocouple is adjacent to a secondary diode.

* * * * *